Sept. 22, 1970   W. MÜLLER-RID ET AL   3,529,936
APPARATUS FOR PRODUCING BINDER PARTICLES BY PRECIPITATION
Filed Dec. 13, 1968   3 Sheets-Sheet 1

INVENTOR.
WILHELM MÜLLER-RID
ERNST ALBERT SCHÖFFMAN
WERNER SCHÖN

Edmund M. Jaskiewicz
ATTORNEY

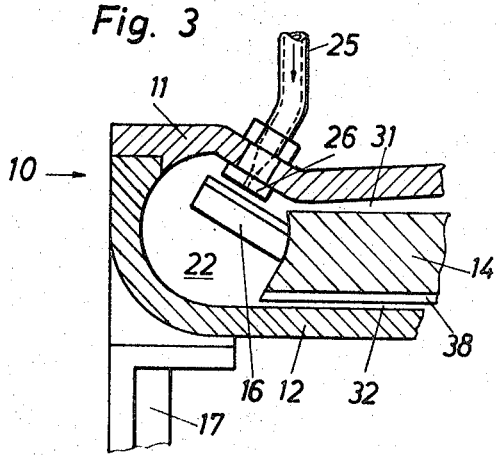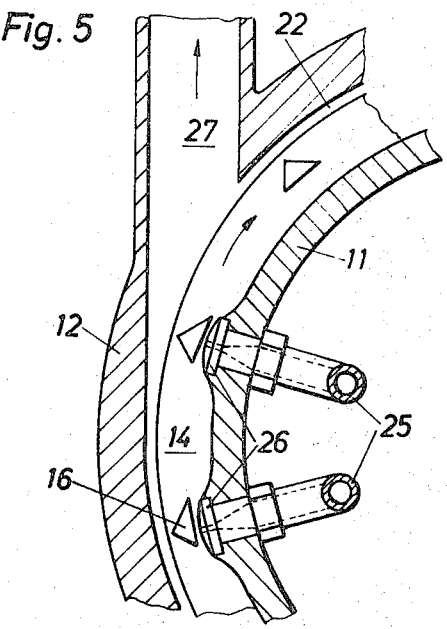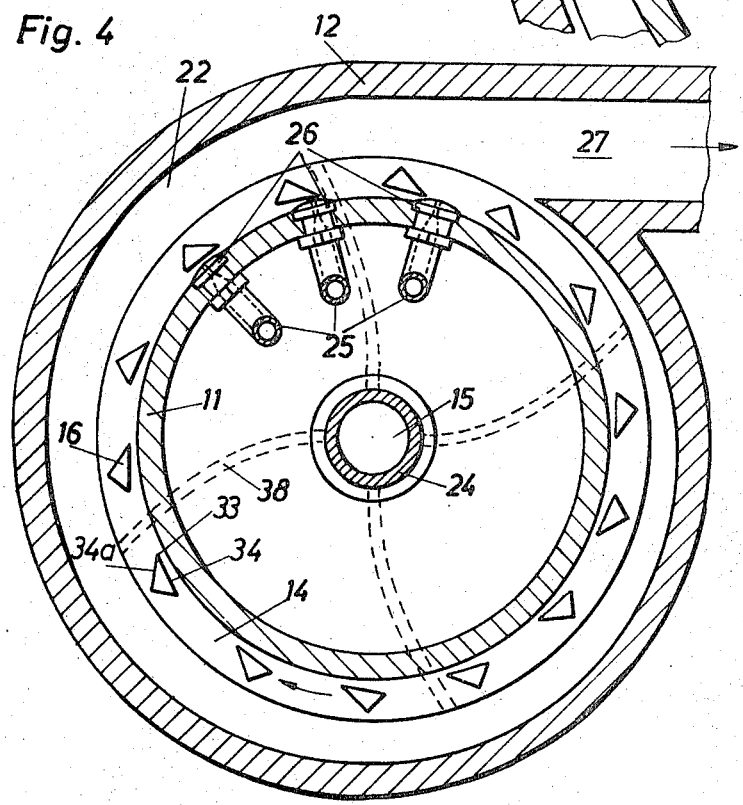

Sept. 22, 1970  W. MÜLLER-RID ET AL  3,529,936
APPARATUS FOR PRODUCING BINDER PARTICLES BY PRECIPITATION
Filed Dec. 13, 1968  3 Sheets-Sheet 3

INVENTOR.
WILHELM MÜLLER-RID
ERNST ALBERT SCHÖFFMAN
WERNER SCHÖN

Edmund M. Jaskiewicz
ATTORNEY 3,529,936
APPARATUS FOR PRODUCING BINDER
PARTICLES BY PRECIPITATION
Wilhelm Müller-Rid, Ernst Albert Schöffmann, and Werner Schön, Heidenheim (Brenz), Germany, assignors to Firma J. M. Voith GmbH., Heidenheim (Brenz), Germany, a limited liability company of Germany
Filed Dec. 13, 1968, Ser. No. 783,594
Claims priority, application Germany, Dec. 16, 1967,
1,729,853
Int. Cl. C08c 1/16; C01j 2/06
U.S. Cl. 23—252                                    10 Claims

ABSTRACT OF THE DISCLOSURE

Apparatus for producing binder particles by the precipitation of latex and having a closed circular casing with an annular chamber about its periphery. An inlet conduit is connected coaxially with the casing and an outlet conduit is connected tangentially to the annular chamber. A plurality of inlet nozzles are connected to the annular chamber to discharge latex therein in a direction away from the rotational axis of the casing. A disk is rotatably mounted within the casing and is provided with shearing blades at its periphery so that the blades move in a circular path within the annular chamber. The shearing blades are perpendicular to the axes of the inlet nozzles and move across these axes at only a slight distance from the nozzles.

---

The present invention relates to the production of binder particles by the precipitation of synthetic polymers and the like, more particularly, to an apparatus for shearing particles precipitated from a latex.

The binder particles to which the present invention relates have been discovered to be suitable for many applications. Such binder particles may be formed by precipitating a synthetic polymer or a latex in an apparatus by the use of shearing forces. When the term "polymer" is used in describing the present invention it is to be understood that latex is also included. The polymers may be dissolved or dispersed in a liquid or may be liquified or foamed. These binder particles are non-rigid and fibrous in nature and can be bound together to form sheet-like structures on a paper-making machine. The binder particles may also be used to bind other fibers of sheet-like structures such as paper, cardboard or non-woven textiles also produced upon paper-making machines. When such non-rigid synthetic polymeric particles have a high surface area per volume and an exceptional ability to form paper-like structures upon a conventional papermaker's screen, they have been designated in the technical literature as "fibrids."

Various forms of precipitation devices have been proposed for continuously producing synthetic binder particles. In one such apparatus a precipitant is circulated in a substantially cylindrical chamber in which there rotates a coaxial rotor having axially parallel shearing blades. The rotating blades pass in close relationship to axially parallel stationary blades. Coaxial inlet and outlet conduits are mounted on opposite sides of the casing. A plurality of nozzles discharge a polymer radially inwardly toward the rotating blades.

This known apparatus has several disadvantages. Because of the coaxial arrangement of the outlet conduit the dwell time of the newly formed binder particles in the casing is very irregular and as a result the sizes of the particles are also irregular. Such an apparatus may be termed a re-entry fibridator since some of the newly formed polymer particles are returned several times to the shearing zone where they are further sheared. The characteristics of such a re-entry fibridator can lead to unsatisfactory operation because if the dwell time in the casing is too long there is a likelihood of the binder particles becoming attached to the stationary and rotating blades where they will again tend to agglomerate. Although this tendency to agglomeration can always be prevented by the addition of suitable agents, such agents are expensive and may adversely affect the quality of a sheet-like structure formed with such binder particles. As an example, some such agents cause hardening of the sheet-like structure.

Another disadvantage of a precipitation apparatus as described above is that with the use of such shearing blades the discharge of the polymer from the inlet nozzles will be occasionally hindered or actually interrupted. Further, since the polymer is discharged from the nozzles in directions toward the rotational axis of the casing there is always the danger of some of the precipitant being forced into the radially inwardly directed nozzles by the centrifugal force of the rotating liquid. Since the nozzles are likely to become clogged by this action it is apparent that the operation of such an apparatus is not entirely dependable. This clogging of the nozzles could be avoided by using a sufficiently high pressure in the nozzles introducing the polymer into the casing. However, the use of such a high pressure has a particular disadvantage when forming binder particles from a latex foam, because such latex foams are pressure sensitive, i.e. they must not be exposed to excessive pressures as they otherwise collapse. For this reason the above described known form of precipitating apparatus cannot be used for the production of binder particles from latex foams.

It is the principal object of the present invention to provide a novel and improved apparatus for the production of binder particles from latex.

It is another object of the present invention to provide such an apparatus wherein binder particles may be produced from latex, the binder particles having a uniform size and wherein the particles will not tend to conglomerate, even without the use of various preventative agents.

It is a further object of the present invention to provide such an apparatus wherein also latex foams may be used to produce binder particles.

In one aspect of the present invention there may be provided an apparatus for the production of binder particles by the precipitation of synthetic polymers. This apparatus may essentially comprise a closed casing having an annular chamber. An inlet conduit is connected to the casing for introducing a precipitant therein and an outlet conduit is tangentially connected to the annular chamber. The cross-sectional area of the outlet conduit is substantially equal to that of the annular chamber. A plurality of inlet nozzles are connected to the casing to discharge therein a polymer in a direction away from the rotational axis of the casing. Within the casing there is rotatably mounted a disk which has a plurality of shearing blades at its periphery for movement in a circular path within the annular chamber. The shearing blades are perpendicular to the axes of the inlet nozzles and move across these axes at only a slight distance from the discharge ends of the nozzles.

Other objects and advantages of the present invention will be apparent upon reference to the accompanying description when taken in conjunction with the following drawings wherein:

FIG. 3 is a portion of a longitudinal sectional view of a modified precipitating apparatus having an annular chamber with a circular cross-section;

FIG. 4 is a view similar to that of FIG. 2 but shows a precipitating apparatus with an annular chamber gradually increasing in cross-sectional area toward the outlet conduit;

FIG. 5 is a portion of a transverse sectional view showing a precipitating apparatus having varying cross-sectional areas in the vicinity of the inlet nozzles;

Proceeding next to the drawings wherein like reference symbols indicate the same parts throughout the various views a specific embodiment and modifications of the present invention will be described in detail.

Figure 1:
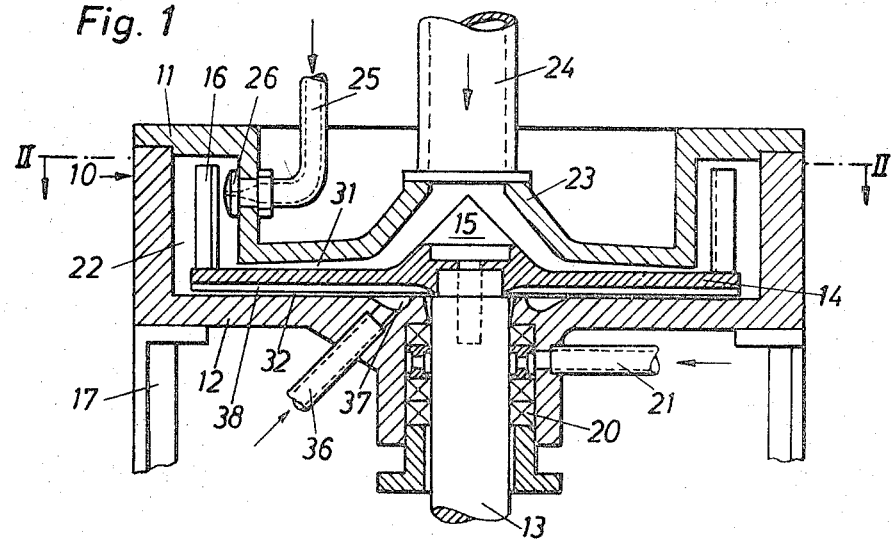
FIG. 1 is a longitudinal sectional view of a precipitating apparatus according to the present invention.
Figure 2:
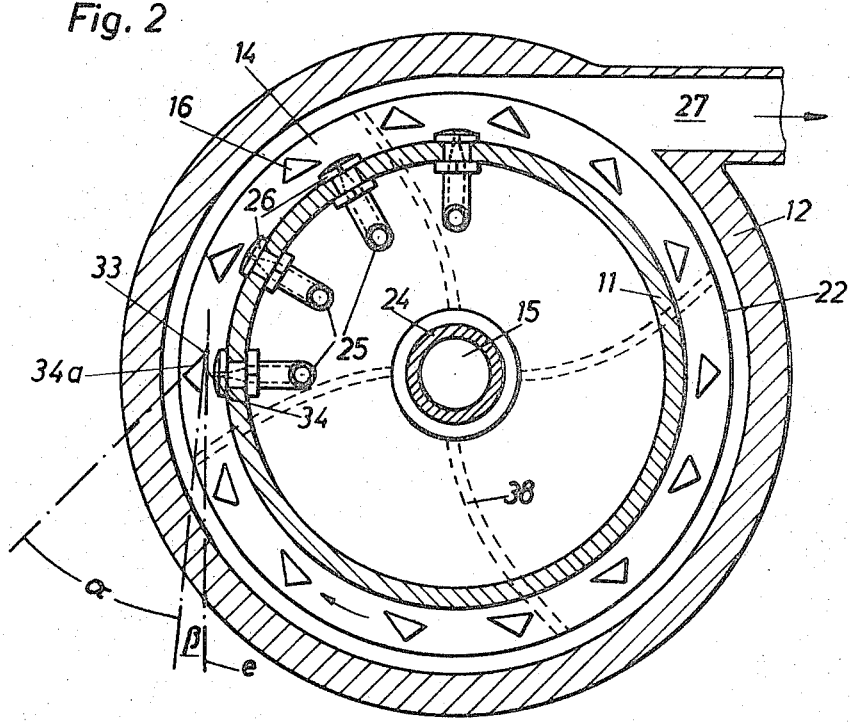
FIG. 2 is a transverse sectional view taken along the line II—II of FIG. 1.

In FIGS. 1 and 2 there is illustrated a precipitation apparatus comprising a rotationally symmetrical casing indicated generally at 10 and formed from an upper portion 11 and a lower portion 12. A rotor shaft 13 extends through the lower casing portion 12 to the exterior and is journalled in a bearing (not shown). A rotor in the form of a circular disk 14 is mounted on the end of shaft 13 within the casing by means of a retaining screw 15. A plurality of shearing blades 16 are mounted on the periphery of the disk 14 and are parallel to the rotational axis of the casing which coincides with the rotary axis of the shaft 13.

The lower casing portion 12 is supported by carrier arms 17 upon a suitable structure. The entire precipitation apparatus may be mounted directly onto the housing of an electric motor by means of the arms 17 and the armature shaft of the motor can serve as the rotor shaft 13 of the precipitation apparatus.

A stuffing box is provided between the rotor shaft 13 and the lower casing portion 12 and is sealed by a packing 20 expanded by a sealing fluid introduced through a conduit 21.

The two casing portions 11 and 12 are substantially cup-shaped so that when assembled as shown in FIG. 1 they define an annular chamber 22 which is rectangular in cross-section. The annular chamber 22 may have other shapes such as the circular cross-section shown in FIG. 3. In the apparatus of FIG. 3, the shearing blades 16 form an angle of 60° with the rotational axis of the casing.

The surfaces of the casing portions 11 and 12 inwardly of the annular chamber form relatively flat spaces 31 and 32 with the opposing faces of disk 14.

The upper casing portion 11 is formed with a conical inlet connection 23 to which is connected a coaxial inlet conduit 24 through which the precipitant is introduced into the casing. The face of the rotary disk 14 directed toward the inlet conduit 24 merges gradually into the conical head of retaining screw 15. The width of space 31 between the upper casing portion 11 and the corresponding face of the disk gradually decreases toward the periphery so that the total cross-sectional area of the passage from the conduit connection 23 to the annular chamber 22 remains substantially uniform.

The latex which is the starting material for the binder particles is introduced through tubular conduits 25 and discharged through inlet nozzles 26 into the annular chamber 22 in a direction away from the rotational axis of the casing and perpendicular to the longitudinal axes of the shearing blades 16.

Four inlet nozzles 26 are provided and they are uniformly spaced in a 90° sector of the annular chamber 22. An outlet conduit 27 is connected to the annular chamber 22 and is tangential thereto. The outlet conduit 27 is in a sector of the annular space which is immediately behind the sector having the inlet nozzles therein. The cross-sectional area of outlet conduit 27 is equal to that of the annular chamber 22.

Each shearing blade 16 has an edge 33 along its entire length formed by the intersection of flat surfaces 34 and 34a. The edge 33 is in the direction of rotation of the blades. Flat surface 34a is at an angle $\alpha$ of about 45° with flat surface 34. Flat surface 34 forms an angle $\beta$ of 5° with a plane $e$ which passes through the edge 33 and is tangential to the circular path of the edge 33. The angle $\beta$ may range from 1–25°. As a result of this arrangement of the flat surfaces the edge 33 presents an angle of about 45° in the direction of movement of the blades.

To prevent any of the binder particles from entering into the clearance space 32, a rinsing fluid is introduced into this space through a conduit 36 entering into an annular groove 37. The face of the disk 14 directed toward the space 32 is provided with a plurality of fins or ribs 38 which are curved and radiate outwardly from the center of the disk as may be seen in FIG. 2.

While the apparatus of FIGS. 1 and 2 is illustrated on a vertical axis, other arrangements are possible. By way of example, the casing can be suspended from above or the casing may be mounted with its rotational axis in a horizontal plane.

In FIG. 4 there is illustrated a modification of the precipitation apparatus wherein the annular chamber 22 has a progressively increasing cross-sectional area in the direction of rotation similar to the spiral housing of a centrifugal pump. The smallest cross-sectional area of the annular space occurs immediately after outlet opening 27. At this point, the width of the annular chamber is only slightly greater than the width of the shearing blades 16. From this minimum width the cross-sectional area gradually increases in the direction of rotation of the disk until it equals the cross-sectional area of the outlet opening 27. A precipitation apparatus incorporating this modified annular chamber has improved pumping action and more accurately guides the passage of the coagulated binder particles as they flow directly outwardly through the outlet conduit 27.

In the modification illustrated in FIG. 5 the annular space 22 is constricted in the vicinity of each inlet nozzle 26 but returns to its original cross-sectional area beyond the inlet nozzles. Thus, the cross-sectional area of the annular chamber decreases in the vicinity of an inlet nozzle to the nozzle opening and then progressively increases to form a constriction as shown in the fragmentary view of FIG. 5. Providing these constricted areas in the annular chamber increases the flow of the liquid in the vicinity of the nozzles and thus reduces the pressure in this region. The reduction of pressure prevents the entry of any of the liquid or precipitant into the inlet nozzles 26.

Figure 6:
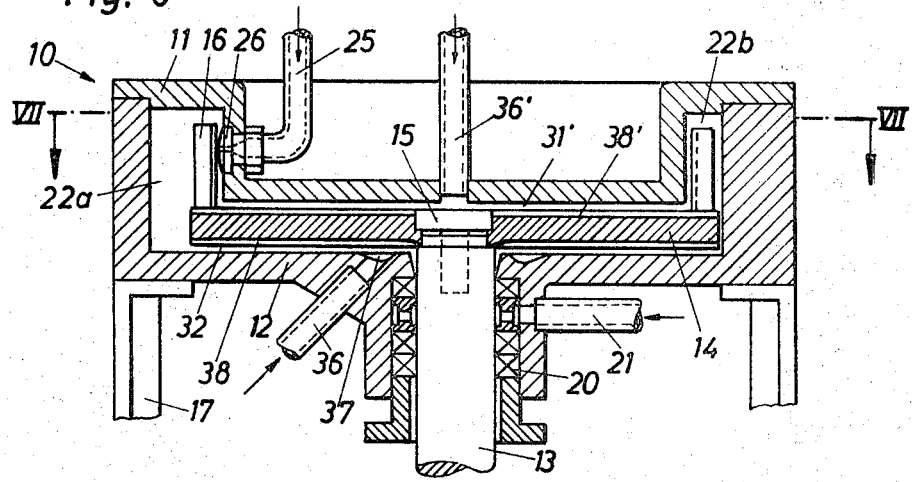
FIG. 6 is a longitudinal sectional view of a precipitating apparatus having a tangential inlet conduit connection.
Figure 7:
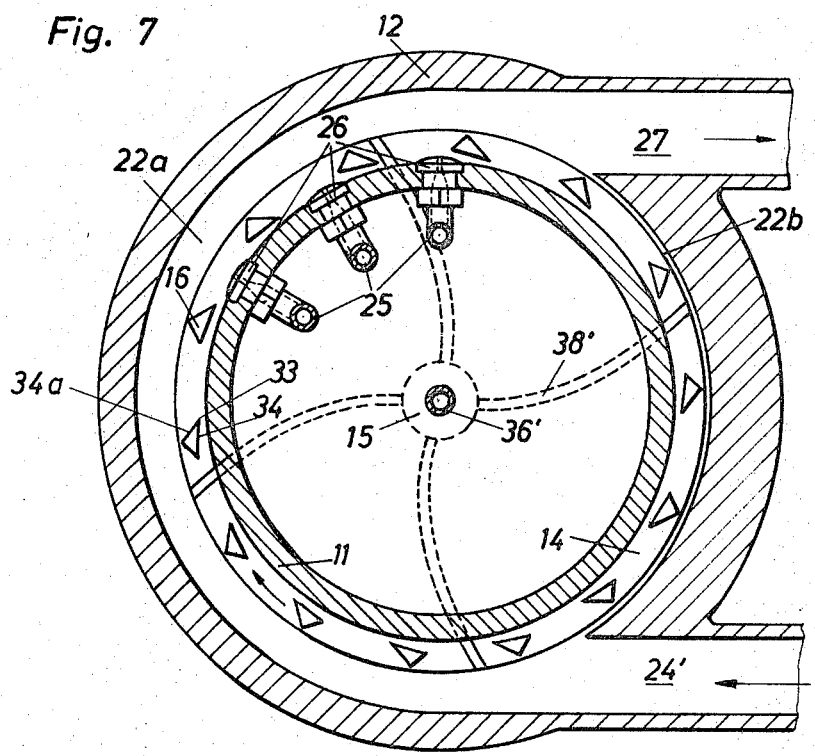
FIG. 7 is a transverse sectional view taken along the line VII—VII of FIG. 6.

In the modification of FIGS. 6 and 7 the precipitation apparatus is provided with a simplified circulation path for the slurry of the precipitant and polymer particles. Instead of the coaxial inlet conduit as shown in FIGS. 1 and 2, there is provided an inlet conduit 24' which is tangentially connected to the annular chamber 22 so that the precipitant is discharged directly into the annular chamber. The inlet conduit 24' and the outlet conduit 27 both have the same cross-sectional areas as that portion 22a of the annular chamber located between the two conduits. The remaining portion 22b of the annular chamber is narrower in width and has a smaller cross-sectional area with its width being only slightly greater than the width of the shearing blades 16 as may be seen in FIG. 7.

In this modification, the clearance spaces 31' and 32 formed between the upper and lower casing portions 11 and 12 and the corresponding faces of the disk 14 are of uniform width as may be seen in FIG. 6 and are supplied with a washing fluid. The fluid is introduced to the respective clearance spaces through the conduits 36' and 36. Both faces of the rotary disk 14 are provided with the spiral blades or ribs 38 and 38'.

By actual tests it has been established that a precipitation apparatus according to the present invention having only moving shearing blades, without any stationary blades, will impart completely adequate shear forces to divide the particles precipitating from a latex dispersion into binder particles.

It has also been found that the precipitation apparatus disclosed herein will prevent the accumulation of binder particles without the use of any protective agents by eliminating the recirculation or re-entry of precipitated latex particles in the shearing zone and by keeping very short the dwell time of the particles within the casing. The dwell time of the binder particles has been significantly decreased by restricting the movement of the binder particles to only the annular working chamber. The binder particles are forced to leave the annular chamber through the outlet conduit after passing through a maximum of one circular movement through the chamber. This avoids any accumulation of the binder particles and any subsequent deposition of accumulated particles on the shearing blades, without the use of any protective or preventative substances. The relationship between the casing and the rotor enables the apparatus to function as a pump for the precipitating material. As a result, only a low pressure is required in the inlet conduit for the precipitant.

The present precipitation apparatus has other advantages resulting from the annular shape of the chamber together with the inlet nozzles discharging in a direction away from the rotational axis of the casing. When a liquid circulates in an annular space it is known that there will be a greater hydrostatic pressure at the outer wall of this space than at its inner wall. By positioning the outlet openings of the latex inlet nozzles in the region of decreased pressure, i.e. adjacent the inner wall, the likelihood of the latex being forced into the nozzles and clogging them is greatly reduced. It is also possible to introduce the latex into the annular chamber under a lower pressure than would be the case if the nozzles were directed toward the rotational axis of the casing. This advantage is of particular significance when the apparatus is to be used with latex foams which are pressure sensitive.

The shearing blades are each provided with a sharp edge along its entire length with one of the flat surfaces which forms the edge facing toward the inlet nozzles and forming an angle ranging from 1–25° with a plane passing through the edge of the blade and tangential to the circular movement thereof. This shearing blade construction has the advantage that the circulating blades do not generate any pressure waves which could force some of the precipitant into the inlet nozzles and thus clog them. The open angle between the blade surface facing toward the inlet nozzles and the plane tangential to the movement of the blade establishes a zone of decreased pressure between the shearing blades and the inlet nozzles so that latex will be sucked out of the nozzles to further lower the pressure under which the latex is introduced to the nozzles. By varying the size of this open angle the rate at which latex is discharged from the nozzles may also be varied.

As viewed in the direction of rotation of the shearing blades, the inlet nozzles are positioned in that sector of the annular chamber that is immediately in front of the outlet conduit connection. When a large number of inlet nozzles are employed, certain of these nozzles may be positioned above each other with respect to the direction of the rotational axis of the casing. This arrangement has the advantage that the dwell time of the binder particles in the casing is further reduced and the danger of particle accumulation further decreased. The dwell time can also be varied during operation of the apparatus by a relative rotation of the upper and lower portions of the casing.

It is therefore apparent that the advantages of the present precipitation apparatus result from the following features:

(a) The shearing blades move through an annular chamber in the casing.

(b) The outlet conduit connection is tangential to the annular chamber and has approximately the same cross-sectional area as the annular chamber.

(c) The inlet nozzles are so positioned that they discharge in a direction away from the rotational axis of the casing.

It is further apparent that the precipitation apparatus of the present invention is particularly suitable for use with pressure sensitive latex foams and that at the same time is sufficiently dependable to operate properly while being subjected to the rough treatment generally encountered in the paper and cardboard manufacturing industries. This precipitation apparatus is particularly suitable for use in a system where the binder particles are produced just before they are to be mixed with a fiber or staple suspension on a paper making machine.

It will be understood that this invention is subject to modification in order to adapt it to different uses and conditions and, accordingly, it is desired to comprehend such modification within this invention as may fall within the scope of the appended claims.

What is claimed is:

1. An apparatus for producing binder particles by precipitation of synthetic polymers, and comprising a closed casing having an annular chamber, an inlet conduit connected to said casing for introducing a precipitant therein, an outlet conduit connected to said casing and tangential to said annular chamber, the cross-sectional area of said outlet conduit being substantially the same as that of the annular chamber, inlet nozzle means connected to said casing to discharge a polymer therein in a direction away from the rotational axis of the casing, and a disk rotatable within said casing and having a plurality of shearing blades at the periphery thereof for movement in a circular path within said annular chamber, said shearing blades being perpendicular to the axis of the inlet nozzle means and moving across said axis at a slight distance from the nozzle means.

2. An apparatus as claimed in claim 1 with said inlet and outlet conduits and said inlet nozzle means being on the same side of the rotatable disk.

3. An apparatus as claimed in claim 1 with each shearing blade having a pair of surfaces intersecting at an acute angle to define an edge along the length thereof in the direction of movement of the blade, the inner one of said surfaces forming an angle of 1–25° with a plane passing through the edge and tangential to the movement of the edge.

4. An apparatus as claimed in claim 1 with said inlet nozzle means being connected to the sector of said annular chamber in front of the sector of said annular chamber to which said outlet conduit is connected in the direction of rotation of said disk.

5. An apparatus as claimed in claim 1 with said inlet conduit being coaxial with said rotatable disk, said casing having a surface spaced from said disk to define a space having a substantially constant cross-sectional area between said inlet conduit and said annular chamber for the flow of the precipitant therebetween.

6. An apparatus as claimed in claim 1 with the radial width of said annular chamber immediately behind the outlet conduit connection being only slightly greater than the radial width of a shearing blade, the radial width of said annular chamber gradually increasing until at the outlet connection the width is equal to the radial width of the outlet connection.

7. An apparatus as claimed in claim 1 with said inlet conduit connection being tangentially connected to said annular chamber and having a cross-sectional area equal to that portion of the annular chamber between the inlet and outlet connections.

8. An apparatus as claimed in claim 1 with the radial width of said annular chamber gradually decreasing and then increasing in the vicinity of said inlet nozzle means.

9. An apparatus as claimed in claim 1 with said disk having a plurality of spiral ribs on a face thereof.

10. An apparatus as claimed in claim 1 with said annular chamber having a substantially circular cross-section with said shearing blades being at an angle of 60° with respect to the rotational axis of said casing.

References Cited

UNITED STATES PATENTS

| | | | |
|---|---|---|---|
| 2,502,445 | 4/1950 | Fash | 23—285 XR |
| 2,717,195 | 9/1955 | Armstrong | 162—24 XR |
| 2,734,685 | 2/1956 | Saito | 162—24 XR |
| 3,163,402 | 12/1964 | Yamashita | 259—6 |
| 3,357,798 | 12/1967 | Yamashita | 23—1 |
| 3,457,047 | 7/1969 | Tokimatsu et al. | 23—260 |

JAMES H. TAYMAN, Jr., Primary Examiner

U.S. Cl. X.R.

264—14; 162—26; 23—1, 285; 259—8, 96; 260—815, 821